(12) United States Patent
Itano

(10) Patent No.: US 10,046,898 B2
(45) Date of Patent: Aug. 14, 2018

(54) PACKAGING MATERIAL

(71) Applicant: KYOCERA Document Solutions Inc., Osaka-shi, Osaka (JP)

(72) Inventor: Atsushi Itano, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 154 days.

(21) Appl. No.: 15/353,560

(22) Filed: Nov. 16, 2016

(65) Prior Publication Data

US 2017/0144819 A1 May 25, 2017

(30) Foreign Application Priority Data

Nov. 19, 2015 (JP) .................................. 2015-226965

(51) Int. Cl.
*B65D 81/02* (2006.01)
*B65D 81/133* (2006.01)
*B65D 81/03* (2006.01)
*F16F 7/00* (2006.01)
*B65D 57/00* (2006.01)

(52) U.S. Cl.
CPC ........... *B65D 81/133* (2013.01); *B65D 81/03* (2013.01); *B65D 57/00* (2013.01); *F16F 7/003* (2013.01)

(58) Field of Classification Search
CPC ...... B65D 81/133; B65D 81/03; B65D 57/00; F16F 7/003
USPC .......................... 206/521; 229/163, 152, 194
See application file for complete search history.

(56) References Cited

FOREIGN PATENT DOCUMENTS

JP 2013-228605 A 11/2013

*Primary Examiner* — Anthony Stashick
*Assistant Examiner* — James M Van Buskirk
(74) *Attorney, Agent, or Firm* — Alleman Hall Creasman & Tuttle LLP

(57) ABSTRACT

A packaging material is formed from a shock-absorbing plate material and stored in a packaging box with a packaged article. The packaging material includes a base portion and a shock absorbing portion. The shock absorbing portion surrounds three sides of a space along a main surface of the base portion. First and second vertical plate portions of the shock absorbing portion face each other and continue to the base portion. In the shock absorbing portion, a third vertical plate portion continues to the second vertical plate portion, and a fourth vertical plate portion continues to the third vertical plate portion. The fourth vertical plate portion is overlaped on the first vertical plate portion. A hook portion of the shock absorbing portion continues to the fourth vertical plate portion, and has a second cut in which a bottom portion of the first cut of the first vertical plate portion is inserted.

4 Claims, 6 Drawing Sheets

PACKAGING MATERIAL

INCORPORATION BY REFERENCE

This application is based upon and claims the benefit of priority from the corresponding Japanese Patent Application No. 2015-226965 filed on Nov. 19, 2015, the entire contents of which are incorporated herein by reference.

BACKGROUND

The present disclosure relates to a packaging material formed from a shock-absorbing plate material.

In general, a packaging material formed from a shock-absorbing plate material such as a corrugated cardboard is often stored in a packaging box of a rectangular parallelepiped shape together with a packaged article. The packaging material is assembled by folding a flat preform along ruling lines that have been formed on the preform in advance. The packaging box is also formed from a shock-absorbing plate material such as a corrugated cardboard.

The packaging material may be coupled with other packaging members by an insertion structure or the like. On the other hand, the packaging material may be an independent member, not coupled with other packaging members.

The packaging material independent of the other packaging members is inserted between the packaged article and the inner surface of the packaging box. In this case, the packaging material functions as a spacer member for maintaining a gap between the packaged article and the inner surface of the packaging box. Furthermore, when the packaging box receives an external force by, for example, falling, the packaging material crushes and thereby absorbs a shock applied to the packaged article.

SUMMARY

A packaging material according to an aspect of the present disclosure is formed from a shock-absorbing plate material and stored in a packaging box together with a packaged article. The packaging material includes a base portion and a shock absorbing portion. The base portion is formed along a flat plane. The shock absorbing portion surrounds three sides of a space along a main surface of the base portion. The shock absorbing portion includes a first vertical plate portion, a second vertical plate portion, a third vertical plate portion, a fourth vertical plate portion, and a hook-like portion. The first vertical plate portion continues to the base portion via a first bending portion, is erected on the main surface of the base portion, and has a first cut extending from a first side edge along the base portion, the first side edge being one of opposite side edges of the first vertical plate portion and extending along a standing direction of the first vertical plate portion. The second vertical plate portion continues to the base portion via a second bending portion and is erected on the first main surface of the base portion in such a way as to face the first vertical plate portion. The third vertical plate portion continues to the second vertical plate portion via a third bending portion formed along the standing direction of the second vertical plate portion, and extends from the third bending portion to a fourth bending portion extending along a second side edge that is the other of the opposite side edges of the first vertical plate portion. The fourth vertical plate portion continues to the third vertical plate portion via the fourth bending portion, and is overlaped on a surface of the first vertical plate portion that is opposite to another surface of the first vertical plate portion facing the second vertical plate portion. The hook-like portion continues to the fourth vertical plate portion via a fifth bending portion formed along the first cut, is formed in a range of extending from the fifth bending portion, passing through the first cut and being overlaped on the main surface of the base portion, and has a second cut in which a bottom portion of the first cut of the first vertical plate portion is inserted.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the attached drawings. It should be noted that the following embodiment is an example of a specific embodiment of the present disclosure and should not limit the technical scope of the present disclosure.

[Configuration of Packaging Material 1]

Figure 1:
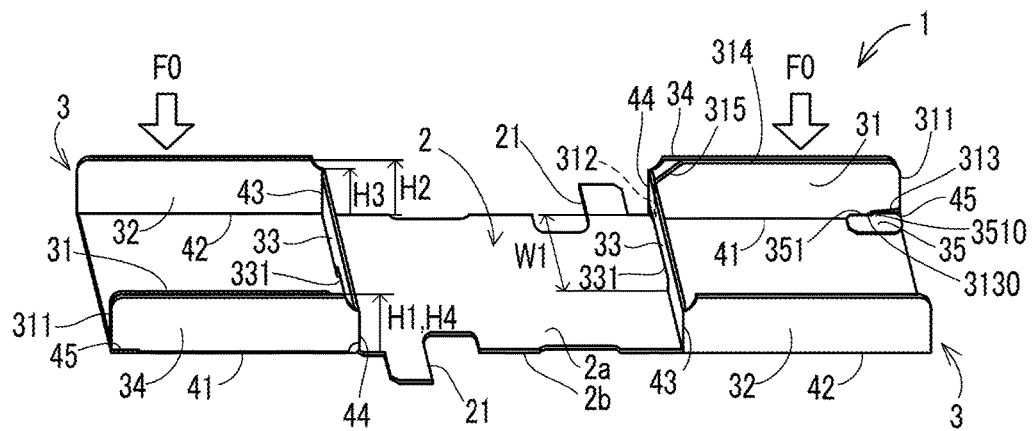
FIG. 1 is a perspective view of a packaging material according to an embodiment of the present disclosure.
Figure 2:
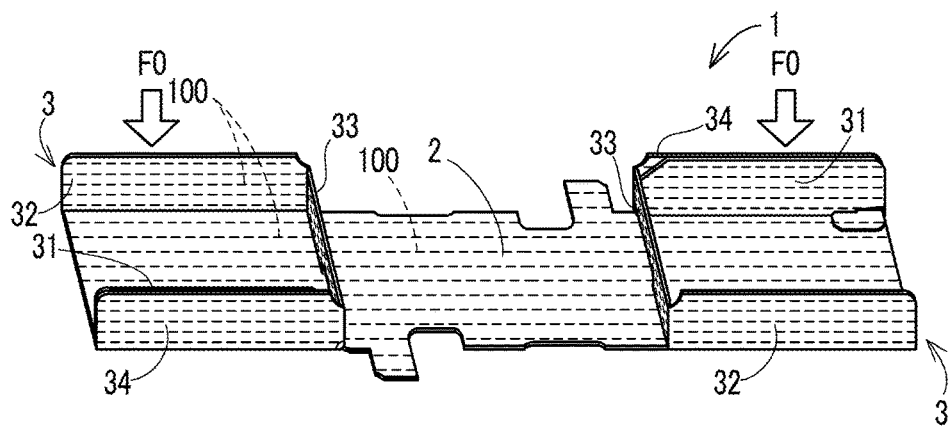
FIG. 2 is a perspective view of the packaging material indicating a corrugation direction of the corrugated cardboard according to the embodiment of the present disclosure.
Figure 3:
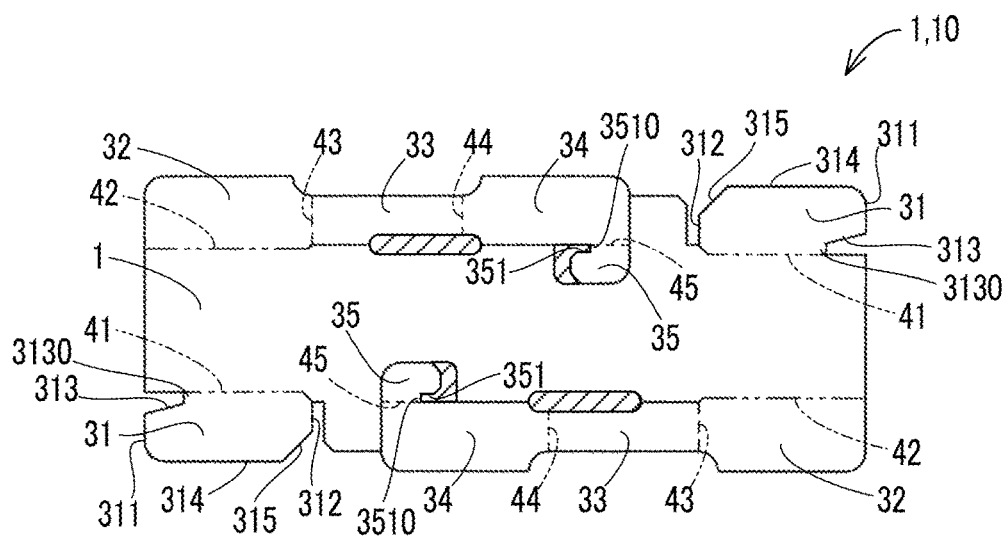
FIG. 3 is a developed view of the packaging material according to the embodiment of the present disclosure.

First, with reference to FIG. 1 to FIG. 3, a configuration of a packaging material 1 according to the present embodiment is described. The packaging material 1 is a member formed from a shock-absorbing plate material. In the present embodiment, the plate material is a corrugated cardboard. It is noted that a shock-absorbing plate material other than the corrugated cardboard may be adopted. As described below, the packaging material 1 is stored in a packaging box 6 together with a packaged article 9 (see FIG. 5).

The packaging material 1 is assembled by folding a flat preform 10 along ruling lines that have been formed on the preform 10 in advance (see FIG. 3). The developed view shown in FIG. 3 is also a plan view of the flat preform 10.

In FIG. 3, the two-dot chain lines indicate the ruling lines. All of the ruling lines shown in FIG. 3 represent valley folds. In addition, in FIG. 3, the solid lines represent the outer appearance of the preform 10 and slits formed in the preform 10. In addition, hatched portions represent openings formed in the preform 10. In FIG. 3, parts that are the same as those shown in FIG. 1 and FIG. 2 are assigned the same reference signs.

As shown in FIG. 1, the packaging material 1 includes a base portion 2 and shock absorbing portions 3. In the present embodiment, a pair of shock absorbing portions 3 are formed in each end portion of the base portion 2 in its longitudinal direction.

The base portion 2 is a flat portion formed along a flat plane. The shock absorbing portions 3 are erected on a surface of the base portion 2. Hereinafter, the surface on which the shock absorbing portions 3 are erected is referred to as a first main surface 2a, and a surface of the base portion 2 that is opposite to the first main surface 2a is referred to as a second main surface 2b.

Each of the shock absorbing portions 3 surrounds three sides of a space along the first main surface 2a of the base portion 2. Each of the shock absorbing portions 3 includes a first vertical plate portion 31, a second vertical plate portion 32, a third vertical plate portion 33, a fourth vertical plate portion 34, and a hook-like portion 35.

The first vertical plate portion 31 continues to the base portion 2 via a first bending portion 41, and is erected on the first main surface 2a of the base portion 2. That is, the first bending portion 41 forms a boundary line between the base portion 2 and the first vertical plate portion 31.

In the first vertical plate portion 31, a first cut 313 is formed. The first cut 313 is formed to extend from a first side edge 311 along the base portion 2, wherein the first side edge 311 is one of opposite side edges of the first vertical plate portion 31 and extends along a standing direction of the first vertical plate portion 31.

It is noted that, of two side edges of the first vertical plate portion 31 extending along the standing direction of the first vertical plate portion 31, one is the first side edge 311 and the other is a second side edge 312. The second side edge 312 is a side edge of the first vertical plate portion 31 located opposite to the first side edge 311.

The second vertical plate portion 32 continues to the base portion 2 via a second bending portion 42, and is erected on the first main surface 2a of the base portion 2. That is, the second bending portion 42 forms a boundary line between the base portion 2 and the second vertical plate portion 32. The second vertical plate portion 32 is formed in such a way as to face the first vertical plate portion 31.

The third vertical plate portion 33 continues to the second vertical plate portion 32 via a third bending portion 43 that is formed along the standing direction of the second vertical plate portion 32. That is, the third bending portion 43 forms a boundary line between the second vertical plate portion 32 and the third vertical plate portion 33.

The third vertical plate portion 33 extends from the third bending portion 43 to a fourth bending portion 44. The fourth bending portion 44 is a portion bending along the second side edge 312 of the first vertical plate portion 31.

The fourth vertical plate portion 34 continues to the third vertical plate portion 33 via the fourth bending portion 44. That is, the fourth bending portion 44 forms a boundary line between the third vertical plate portion 33 and the fourth vertical plate portion 34. The fourth vertical plate portion 34 is formed to be overlaped on a surface of the first vertical plate portion 31 that is opposite to another surface of the first vertical plate portion 31 facing the second vertical plate portion 32.

The hook-like portion 35 continues to the fourth vertical plate portion 34 via a fifth bending portion 45 that is formed along the first cut 313. That is, the fifth bending portion 45 forms a boundary line between the fourth vertical plate portion 34 and the hook-like portion 35. The hook-like portion 35 is formed in a range of extending from the fifth bending portion 45, passing through the first cut 313 and being overlaped on the first main surface 2a of the base portion 2.

The hook-like portion 35 has a second cut 351 in which a bottom portion 3130 of the first cut 313 of the first vertical plate portion 31 is inserted. That is, the hook-like portion 35 protrudes from the fifth bending portion 45 toward the second vertical plate portion 32, and then extends toward the third vertical plate portion 33 along the first bending portion 41, forming a shape of a hook as a whole.

As a result, the hook-like portion 35 is hooked to the bottom portion 3130 of the first cut 313 of the first vertical plate portion 31. In the state where the hook-like portion 35 is hooked to the bottom portion 3130 of the first cut 313, a bottom portion 3510 of the second cut 351 faces the bottom portion 3130 of the first cut 313, and the second cut 351 meshes with the first cut 313.

With the hook-like portion 35 being hooked to the bottom portion 3130 of the first cut 313, overlapping of the fourth vertical plate portion 34 and the first vertical plate portion 31 is maintained, and the first vertical plate portion 31 and the fourth vertical plate portion 34 are kept to be erected.

Here, heights of the first vertical plate portion 31, the second vertical plate portion 32, the third vertical plate portion 33, and the fourth vertical plate portion 34 from the base portion 2 are referred to as a first height H1, a second height H2, a third height H3, and a fourth height H4, respectively.

In the present embodiment, the first height H1 and the second height H2 are equal. The third height H3 is lower than the first height H1 and the second height H2. The fourth height H4 and the first height H1 are equal.

[Usage of Packaging Material 1]

Figure 5:
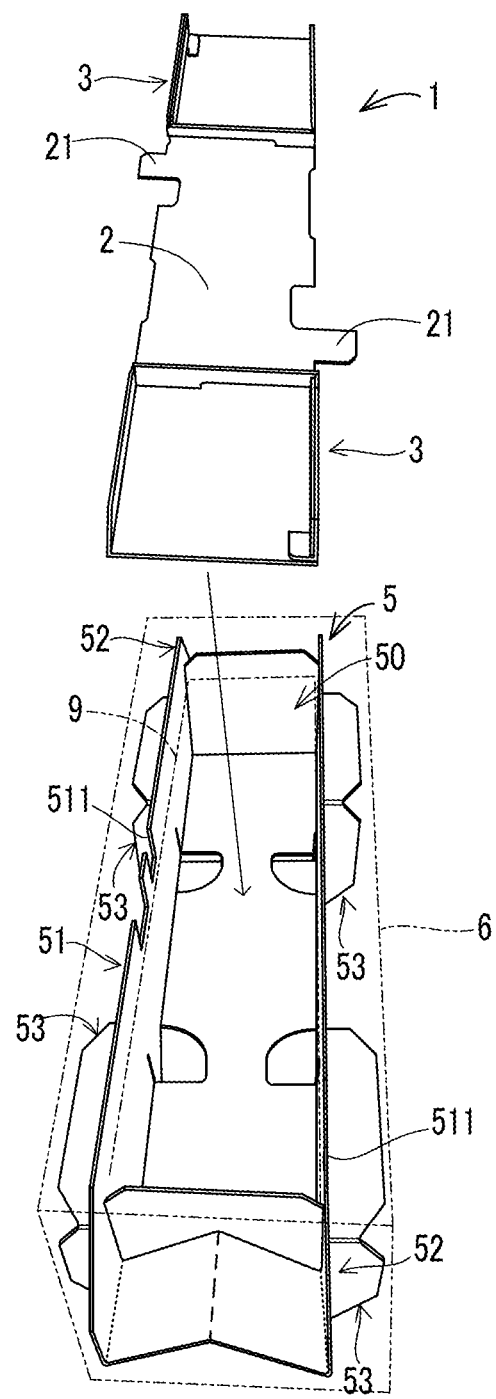
FIG. 5 is a perspective view of the packaging material and an inner packaging container according to the embodiment of the present disclosure.

In FIG. 5, the packaged article 9 and the packaging box 6 are indicated by imagenary lines (two-dot chain lines). The packaged article 9 is, for example, a drum unit, a developing unit, or a fixing unit, each being a part of an electrophotographic image forming apparatus.

The packaged article 9 is stored in an inner packaging container 5 that is formed from a corrugated cardboard. A storage portion 51 has, in its inside, a storage space 50 for storing the packaged article 9.

Figure 6:
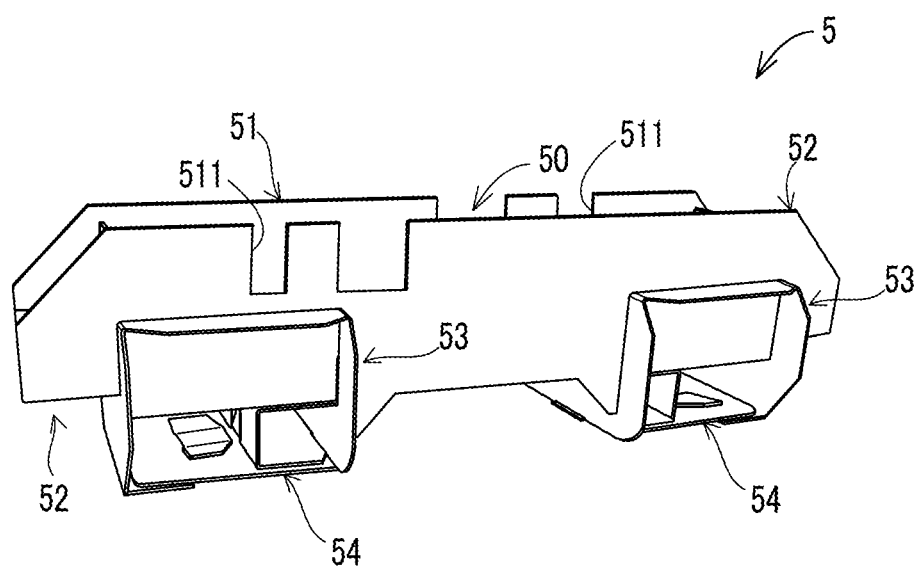
FIG. 6 is a perspective view of an example of the inner packaging container for storing the packaged article.

As shown in FIG. 5 and FIG. 6, the inner packaging container 5 includes the storage portion 51 and a plurality of shock absorbing portions 52, 53 and 54, wherein the storage portion 51 is composed of a bottom plate and four side plates, and the shock absorbing portions 52, 53 and 54 are provided outside the storage portion 51.

The plurality of shock absorbing portions 52, 53 and 54 are end-face shock absorbing portions 52, side-face shock absorbing portions 53, and bottom-face shock absorbing portions 54. The end-face shock absorbing portions 52 are formed outside two opposite end surfaces of the inner packaging container 5 in the longitudinal direction.

The side-face shock absorbing portions 53 are formed outside two opposite side surfaces of the inner packaging container 5. It is noted that the two opposite side surfaces of the inner packaging container 5 are side surfaces of the inner packaging container 5 that are opposite to each other in the lateral direction. The bottom-face shock absorbing portions 54 are formed on the bottom surface of the inner packaging container 5.

As shown in FIG. 5, the packaged article 9 is stored in the inner packaging container 5. Furthermore, the inner packaging container 5 in the state of containing the packaged article 9 is stored in the packaging box 6 of a rectangular parallelepiped shape.

In addition, the packaging material 1 is placed on the packaged article 9 stored in the inner packaging container 5. That is, the packaging material 1 is stored in the packaging box 6 together with the packaged article 9, and functions as a spacer member for maintaining a gap between the upper surface of the packaged article 9 and the lower surface of the top plate of the packaging box 6. The packaging material 1 is an independent member, not coupled with other packaging members such as the inner packaging container 5.

As shown in FIG. 1 and FIG. 5, the base portion 2 of the packaging material 1 includes protruding portions 21 that protrude in a direction perpendicular to the longitudinal direction of the base portion 2. The protruding portions 21 are inserted in cuts 511 formed in the storage portion 51 of the inner packaging container 5. With this configuration, the packaging material 1 is prevented from positionally shifting.

Meanwhile, a conventional packaging material that is independent of other members is often formed in a shape of a square cylinder including top, bottom, left, and right, plate-like portions. A packaging material 8 shown as a reference example in FIG. 7 and FIG. 8 is a typical example of the conventional packaging material.

Figure 7:
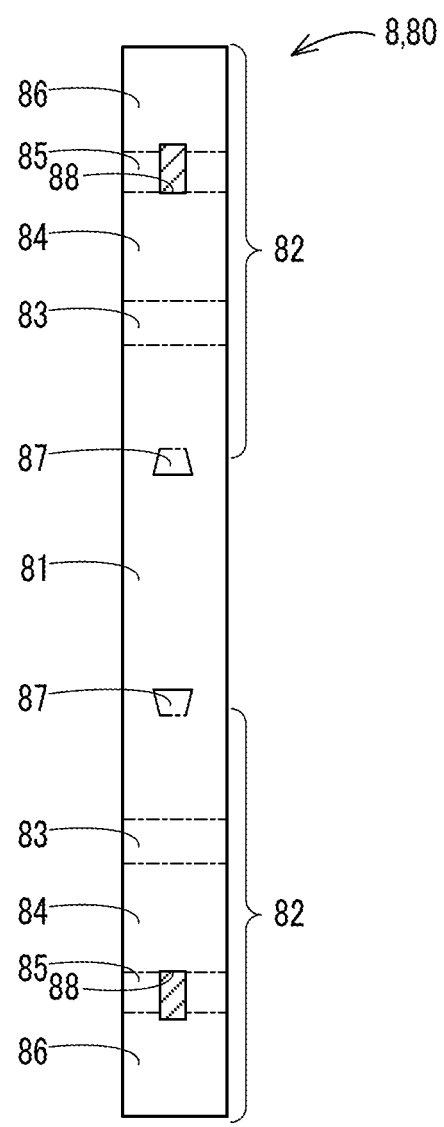
FIG. 7 is a developed view of a packaging material as a reference example.

The packaging material 8 is assembled by folding a flat preform 80 along ruling lines that have been formed on the preform 80 in advance (see FIG. 7). The developed view shown in FIG. 7 is also a plan view of the flat preform 80.

In FIG. 7, the two-dot chain lines indicate the ruling lines. All of the ruling lines shown in FIG. 7 represent valley folds. In addition, in FIG. 7, the solid lines represent the outer appearance of the preform 80 and slits formed in the preform 80. In addition, hatched portions represent openings formed in the preform 80. In FIG. 7 and FIG. 8, the same parts are assigned the same reference signs.

Figure 8:
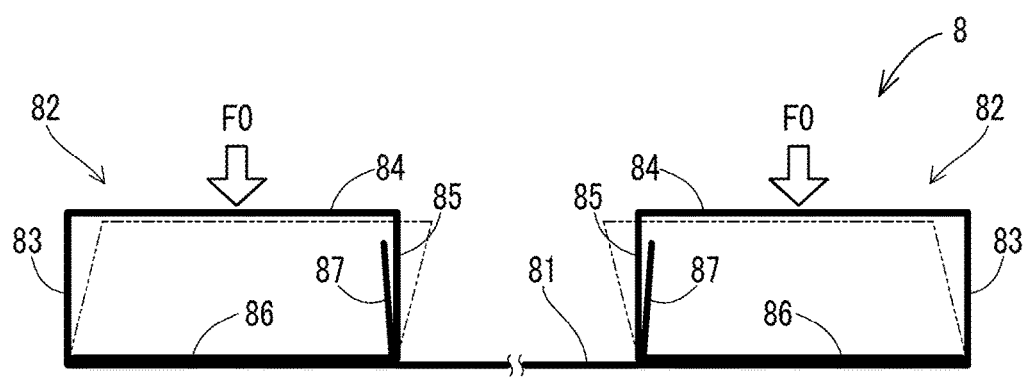
FIG. 8 is a side view of the packaging material as the reference example.

As shown in FIG. 8, the conventional packaging material 8 includes a base portion 81 and shock absorbing portions 82. The shock absorbing portions 82 are each formed in a shape of a square cylinder including top, bottom, left, and right, plate-like portions.

That is, the base portions 82 each include a bottom plate portion 86, a top plate portion 84, a first side plate portion 83, and a second side plate portion 85. In addition, engaging pieces 87 that are cut and raised from the base portion 2 are respectively inserted in openings 88 that are each formed from the bottom plate portion 86 to the second side plate portion 85.

Each engaging piece 87 is, except for the root portion, wider in width than each opening 88. With the engaging pieces 87 being engaged with edges of the openings 88, the square cylinder shape of the shock absorbing portions 82 is maintained. In the example shown in FIG. 7 and FIG. 8, a pair of shock absorbing portions 82 are formed in opposite end portions of the base portion 81 in the longitudinal direction.

In the above-described case, the packaging material 8 can exert the shock absorbing function when a pair of side plate portions 83 and 85 are crushed, wherein the side plate portions 83 and 85 are formed along a direction in which an external force F0 is received.

However, when the shock absorbing portions 82 of the packaging material 8 having the square cylinder shape receive the external force F0, their cross-sectional shapes are apt to deform from rectangle to parallelogram (see the two-dot chain lines in FIG. 8). That is, the side plate portions 83 and 85 that are formed along a direction in which an external force F0 is received, are apt to collapse in a direction perpendicular to the direction of the external force F0 before they are crushed. This may prevent the packaging material 8 from exerting the original shock absorbing function.

In addition, when the packaging material 8 is assembled or disassembled, the preform 80 may often be folded at portions other than the ruling lines formed in advance. In the example shown in FIG. 7 and FIG. 8, the engaging pieces 87 are temporarily folded at portions other than the ruling lines. When this happens, the preform 80 deteriorates, and reuse of the packaging material 8 becomes difficult.

As a result, to increase the reusability of the packaging material 8, the material is preferably difficult to deteriorate during the process of being assembled from the preform 80 and during the process of disassembling the packaging material 8 to the preform 80.

As described above, the packaging material 1 includes the first vertical plate portion 31 and the second vertical plate portion 32 that are formed along a direction in which the external force F0 is received. With the adoption of the packaging material 1, it is possible to avoid the deterioration of the shock absorbing function due to collapse of the first vertical plate portion 31 and the second vertical plate portion 32. Furthermore, the packaging material 1 is difficult to deteriorate during the processes of assembling and disassembling. In the following, a description is given of the acts and effects of the packaging material 1.

[Acts and Effects of Packaging Material 1]

The packaging material 1 exerts the shock absorbing function when the first vertical plate portion 31 and the second vertical plate portion 32 crush as they receive the external force F0 along the standing direction thereof. It is noted that the third vertical plate portion 33 and the fourth vertical plate portion 34 exert the shock absorbing function auxiliarily.

The dotted lines shown in FIG. 2 represent a corrugation direction 100 of the corrugated cardboard. The corrugation direction 100 matches the longitudinal direction of the hollows included in the truss structure of the corrugated cardboard.

As one example, as shown in FIG. 2, the corrugation direction 100 of the first vertical plate portion 31 and the second vertical plate portion 32 may be a horizontal direction perpendicular to the standing direction thereof. This configuration further increases the shock absorbing function with respect to the external force F0.

It is noted that when the corrugation direction 100 of the first vertical plate portion 31 and the second vertical plate portion 32 is the horizontal direction, the corrugation direction 100 of the third vertical plate portion 33 and the fourth vertical plate portion 34 is also the horizontal direction.

On the other hand, in the case where the rigidity of the shock absorbing portions 3 is desired to be increased with respect to the external force F0, the corrugation direction 100 of the first vertical plate portion 31 and the second vertical plate portion 32 may be a vertical direction which extends along the standing direction thereof. With this configuration, the rigidity with respect to the external force F0 is increased.

In the packaging material 1, the third vertical plate portion 33 couples the second vertical plate portion 32 with the fourth vertical plate portion 34. As a result, when the second vertical plate portion 32 and the fourth vertical plate portion 34 receive a force in the horizontal direction perpendicular to the external force F0, the third vertical plate portion 33 maintains the erected state of the second vertical plate portion 32 and the fourth vertical plate portion 34 against the force of the horizontal direction. In addition, a corner portion formed at the third bending portion 43 by bending the third vertical plate portion 33 and the second vertical plate portion 32, and a corner portion formed at the fourth bending portion 44 by bending the third vertical plate portion 33 and the fourth vertical plate portion 34, also increase the rigidity of the second vertical plate portion 32, the third vertical plate portion 33 and the fourth vertical plate portion 34 with respect to the direction of the external force F0.

Furthermore, the hook-like portion 35 maintains the overlapping of the fourth vertical plate portion 34 and the first vertical plate portion 31. As a result, when the erected state of the fourth vertical plate portion 34 is maintained by the third vertical plate portion 33, the erected state of the first vertical plate portion 31 is also maintained.

As a result, with the adoption of the packaging material 1, it is possible to avoid the deterioration of the shock absorbing function due to collapse of the first vertical plate portion 31 and the second vertical plate portion 32.

In addition, as shown in FIG. 1 and FIG. 3, the third vertical plate portions 33 of the pair of shock absorbing portions 3 are formed close to the center of the base portion 2 in the longitudinal direction. Furthermore, when viewed from the center of the base portion 2 in the longitudinal direction, the configurational elements of the respective shock absorbing portions 3 are point symmetrically related with each other. Here, the configurational elements of the shock absorbing portions 3 are the first vertical plate portion 31, the second vertical plate portion 32, the third vertical plate portion 33, the fourth vertical plate portion 34, and the hook-like portion 35.

When the configurational elements of the shock absorbing portions 3 satisfy the above-described positional relationship, the shape of the preform 10 is relatively close to a square as shown in FIG. 3. On the other hand, as shown in FIG. 7, the preform 80 of the conventional packaging material 8 is thin and elongated.

When the shape of the preform 10 is close to a square, the preform 10 can be easily handled during assembling and disassembling of the packaging material 1.

As one example, the packaging material 1 is assembled from the preform 10 as follows. First, the bending portions 41 to 45 are formed by folding the preform 10 along the ruling lines.

Figure 4:
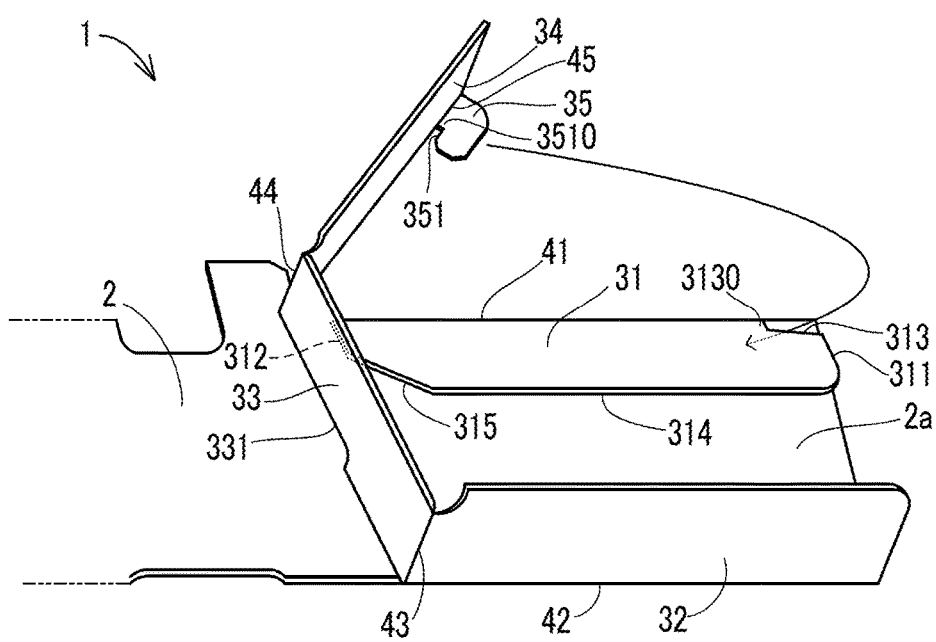
FIG. 4 is a perspective view of the packaging material during assembling according to the embodiment of the present disclosure.

Next, as shown in FIG. 4, in the state where the first vertical plate portion 31 is pressed to be inclined toward the first main surface 2a of the base portion 2, the hook-like portion 35 is hooked to the first cut 313 of the first vertical plate portion 31. Thereafter, the first vertical plate portion 31 is pulled up to be erected from the base portion 2, namely, in a direction of being overlaped on the fourth vertical plate portion 34. This allows the first vertical plate portion 31 to be held between the third vertical plate portion 33 and the bottom portion 3130 of the first cut 313 of the hook-like portion 35. It is noted that the packaging material 1 can be disassembled in the reverse procedure to the procedure of assembling.

When the packaging material 1 is assembled from the preform 10 in the above-described procedure, the preform 10 is not folded at portions other than the ruling lines. As a result, the packaging material 1 is difficult to deteriorate even if it is repeatedly assembled and disassembled. Thus the packaging material 1 has a high degree of reusability.

In addition, as shown in FIG. 1, FIG. 3 and FIG. 4, a cut 331 is formed at an edge of the third vertical plate portion 33, the edge facing the first main surface 2a of the base portion 2. The cut 331 is formed to extend from the fourth bending portion 44 along the base portion 2.

A width W1 of the cut 331 extending along the base portion 2 is larger than the first height H1 (see FIG. 1). In this case, in the procedure shown in FIG. 4, an end portion of the first vertical plate portion 31 on the side of the second side edge 312 can get easily under the third vertical plate portion 33.

The above-described configuration facilitates a step of hooking the hook-like portion 35 to the first cut 313 of the first vertical plate portion 31, and a step of removing the hook-like portion 35 from the first cut 313. Furthermore, this prevents the first vertical plate portion 31 from being caught by the third vertical plate portion 33, thus preventing an unexpected deterioration of the preform 10.

In addition, as shown in FIG. 1, FIG. 3 and FIG. 4, an inclined edge 315 is formed in the outer edge of the first vertical plate portion 31. The inclined edge 315 is formed between the second side edge 312 and a head top edge 314 in the outer edge of the first vertical plate portion 31. It is noted that the head top edge 314 is located opposite to the first bending portion 41.

With the presence of the inclined edge 315, in the procedure shown in FIG. 4, an end portion of the first vertical plate portion 31 on the side of the second side edge 312 can get easily under the third vertical plate portion 33. As a result, this facilitates the step of hooking the hook-like portion 35 to the first cut 313 of the first vertical plate portion 31, and the step of removing the hook-like portion 35 from the first cut 313.

[Application Examples]

In the packaging material 1 shown in FIG. 1, the fourth height 114 may be lower than the first height H1. In this case, the balance in shock absorbing between the first vertical plate portion 31 and the second vertical plate portion 32 is more unified.

In addition, in the packaging material 1 shown in FIG. 1, in the case where the rigidity of the shock absorbing portions 3 is desired to be increased with respect to the external force F0, the third height 113 may be made equal with the first height H1 and the second height 112.

It is noted that the packaging material of the present disclosure may be configured by freely combining, within the scope of claims, the above-described embodiments and application examples, or by modifying the embodiments and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A packaging material formed from a shock-absorbing plate material and stored in a packaging box together with a packaged article, the packaging material comprising:
   a base portion formed along a flat plane; and
   at least one shock absorbing portion surrounding three sides of a space along a main surface of the base portion, wherein
   the shock absorbing portion includes:
   a first vertical plate portion that continues to the base portion via a first bending portion, is erected on the main surface of the base portion, and has a first cut extending from a first side edge along the base portion, the first side edge being one of opposite side edges of the first vertical plate portion and extending along a standing direction of the first vertical plate portion;

a second vertical plate portion that continues to the base portion via a second bending portion and is erected on the first main surface of the base portion in such a way as to face the first vertical plate portion;

a third vertical plate portion that continues to the second vertical plate portion via a third bending portion formed along the standing direction of the second vertical plate portion, and extends from the third bending portion to a fourth bending portion extending along a second side edge that is the other of the opposite side edges of the first vertical plate portion;

a fourth vertical plate portion that continues to the third vertical plate portion via the fourth bending portion, and is overlaped on a surface of the first vertical plate portion that is opposite to another surface of the first vertical plate portion facing the second vertical plate portion; and a hook-like portion that continues to the fourth vertical plate portion via a fifth bending portion formed along the first cut, is formed in a range of extending from the fifth bending portion, passing through the first cut and being overlaped on the main surface of the base portion, and has a second cut in which a bottom portion of the first cut of the first vertical plate portion is inserted.

2. The packaging material according to claim 1, wherein a cut is formed at an edge of the third vertical plate portion, the edge facing the main surface of the base portion, the cut extending from the fourth bending portion along the base portion, and
a width of the cut extending along the base portion is larger than a height of the first vertical plate portion in the standing direction from the base portion.

3. The packaging material according to claim 2, wherein an inclined edge is formed in an outer edge of the first vertical plate portion between the second side edge and a head top edge in the outer edge, the head top edge being located opposite to the first bending portion.

4. The packaging material according to claim 1, wherein the at least one shock absorbing portion is a pair of shock absorbing portions formed on opposite end portions of the base portion in a longitudinal direction thereof,
third vertical plate portions of the pair of shock absorbing portions are formed close to a center of the base portion in the longitudinal direction, and
when viewed from the center of the base portion, configurational elements of the respective shock absorbing portions are point symmetrically related with each other.

* * * * *